US011200609B1

(12) United States Patent
Spears et al.

(10) Patent No.: US 11,200,609 B1
(45) Date of Patent: Dec. 14, 2021

(54) METHOD AND SYSTEM FOR CUSTOMIZING A VEHICLE

(71) Applicant: UIPCO, LLC, San Antonio, TX (US)

(72) Inventors: James Malcolm Spears, San Antonio, TX (US); David Anthony Phelps, San Antonio, TX (US); Brian Thomas Latronico, San Antonio, TX (US); Teresa A. Mays, Helotes, TX (US); Doyle Russell Dennis, Jr., La Vernia, TX (US); Gary Don Bourn, Bulverde, TX (US); Kevin W. Thornley, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/778,087

(22) Filed: Jan. 31, 2020

Related U.S. Application Data

(60) Provisional application No. 62/809,781, filed on Feb. 25, 2019.

(51) Int. Cl.
| *G06Q 30/00* | (2012.01) |
| *G06Q 30/06* | (2012.01) |
| *G06Q 20/10* | (2012.01) |
| *G06Q 20/32* | (2012.01) |
| *G06Q 10/10* | (2012.01) |
| *G06F 16/248* | (2019.01) |
| *G06Q 40/02* | (2012.01) |
| *G06N 20/00* | (2019.01) |

(52) U.S. Cl.
CPC ....... *G06Q 30/0621* (2013.01); *G06F 16/248* (2019.01); *G06Q 10/10* (2013.01); *G06Q 20/108* (2013.01); *G06Q 20/3221* (2013.01); *G06Q 30/0631* (2013.01); *G06Q 30/0633* (2013.01); *G06Q 30/0641* (2013.01); *G06Q 40/025* (2013.01); *G06N 20/00* (2019.01)

(58) Field of Classification Search
None
See application file for complete search history.

(56) References Cited

U.S. PATENT DOCUMENTS

| 8,694,328 B1 * | 4/2014 | Gormley ............. B60R 16/0373 705/1.1 |
| 11,004,128 B1 * | 5/2021 | Mishra ............... G06Q 30/0643 |

(Continued)

*Primary Examiner* — Mila Airapetian
(74) *Attorney, Agent, or Firm* — Plumsea Law Group, LLC

(57) ABSTRACT

A system and method for customizing a vehicle for a user from a dealer through a user interface of a mobile device. The system and method may include a vehicle customization application stored on the mobile device. The user interface can be used to select the vehicle from a plurality of vehicles using the vehicle customization application. The vehicle customization application may create a user desires profile for the user of the vehicle customization application and may retrieve all dealer installed option packages for the selected vehicle from a dealer database of the dealer. Based on the user desires profile and the retrieved dealer installed packages, artificial intelligence may be used to generate a list of dealer installed option packages for the user. The user may select dealer installed option packages from the generated list of dealer installed option packages through the user interface.

20 Claims, 16 Drawing Sheets

(56) References Cited

U.S. PATENT DOCUMENTS

2007/0136162 A1* 6/2007 Thibodeau ............. G06Q 20/12
705/35
2020/0027111 A1* 1/2020 Chikkaveerappa .........................
G06Q 30/0211

* cited by examiner

METHOD AND SYSTEM FOR CUSTOMIZING A VEHICLE

CROSS-REFERENCE TO RELATED APPLICATIONS

This application claims the benefit of Provisional Patent Application No. 62/809,781 filed Feb. 25, 2019, and titled "Method and System for Customizing a Vehicle," which is incorporated by reference herein in its entirety.

TECHNICAL FIELD

The present disclosure generally relates to methods and systems for customizing a vehicle, and in particular, to systems and methods for customizing a vehicle including dealer installed option packages.

BACKGROUND

The customization and/or purchasing of vehicles such as cars, trucks, boats, and airplanes is frequently very cumbersome. Considerations in customizing and purchasing vehicles may include cost of the vehicle, pre-paid maintenance costs of the vehicle, pre-paid repair costs, historical repair and/or maintenance costs of the vehicle, leasing or purchasing vehicle, use of the vehicle, lifestyle of purchaser (customer), projected geographical location of the operation of the vehicle, dealer installed option packages, and insurance costs. However, there are so many considerations for purchasers and purchasers cannot easily make cost comparisons and judgements while negotiating the purchase price of a vehicle. Therefore, there is a need for potential customers to locate a desired vehicle, customize the desired vehicle by selecting option packages, and purchase a desired vehicle for a predetermined price which does not require negotiation by the purchaser at the dealership.

There is a need in the art for a method and system that addresses the shortcomings discussed above.

SUMMARY

In one aspect, a method for customizing a vehicle for a user from a dealer through a user interface of a mobile device, may include initiating a vehicle customization application stored on the mobile device, selecting the vehicle from a plurality of vehicles through the user interface of the mobile device using the vehicle customization application, creating a user desires profile for the user of the vehicle customization application, retrieving all dealer installed option packages for the selected vehicle from a dealer database of the dealer, generating a list of dealer installed option packages for the user from the retrieved dealer installed option packages using artificial intelligence, selecting dealer installed option packages from the generated list of dealer installed option packages though the user interface, transmitting a customized vehicle specification of the vehicle including the selected dealer installed option packages to the dealer from the mobile device, receiving the customized vehicle specification from the mobile device and installing the dealer installed option packages on the vehicle, and receiving the vehicle by the user.

In another aspect, a method for customizing a vehicle for a user from a dealer through a user interface of a mobile device, may include initiating a vehicle customization application stored on the mobile device, retrieving personal information and approved loan information from a financial institution database of a financial institution through a network in response to a request for personal information and approved loan information from the vehicle customization application, selecting the vehicle from a plurality of vehicles through the user interface of the mobile device using the vehicle customization application, creating a user desires profile for the user of the vehicle customization application including the personal information, approved loan information, and the selected vehicle, generating a list of dealer installed option packages for the selected vehicle for the user using artificial intelligence based upon available dealer installed option packages retrieved from a dealer database of the dealer through the network, the personal information, and the approved loan information, selecting dealer installed option packages from the generated list of dealer installed option packages through the user interface, generating a customized vehicle specification of the vehicle including the selected dealer installed option packages, transmitting the customized vehicle specification of the vehicle to the dealer from the mobile device, receiving the customized vehicle specification from the mobile device and installing the dealer installed option packages on the vehicle, and receiving vehicle by the user.

In another aspect, a method for customizing a vehicle for a user from a dealer through a user interface of a mobile device, may include retrieving approved loan information, domicile information, insurance information, and lifestyle information of the user from the financial institution database of the financial institution using the vehicle customization application, generating, using artificial intelligence, one or more questions for the user to answer through the user interface based on the approved loan information, domicile information, insurance information, and lifestyle information, answering one or more questions through the user interface of the mobile device, creating, using artificial intelligence, a user desires profile for the user of the vehicle customization application based upon the answers to the one or more questions, approved loan information, domicile information, insurance information, and lifestyle information, generating a list of vehicles with benefits and detractions associated with each vehicle for consideration by the user using artificial intelligence based upon the user desires profile, selecting the vehicle from among the list through the user interface, generating a list of dealer installed option packages and list of financial option packages for the user from dealer installed option packages and financial option packages stored in a dealer database by applying artificial intelligence, selecting one or more dealer installed option packages and one or more financial option packages from the generated list of dealer installed option packages through the user interface, transmitting an order of the vehicle including the one or more selected dealer installed option packages and one or more financial option packages to the dealer from the mobile device, receiving the order from the mobile device and installing the dealer installed option packages on the vehicle, and receiving vehicle by the user.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The description can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
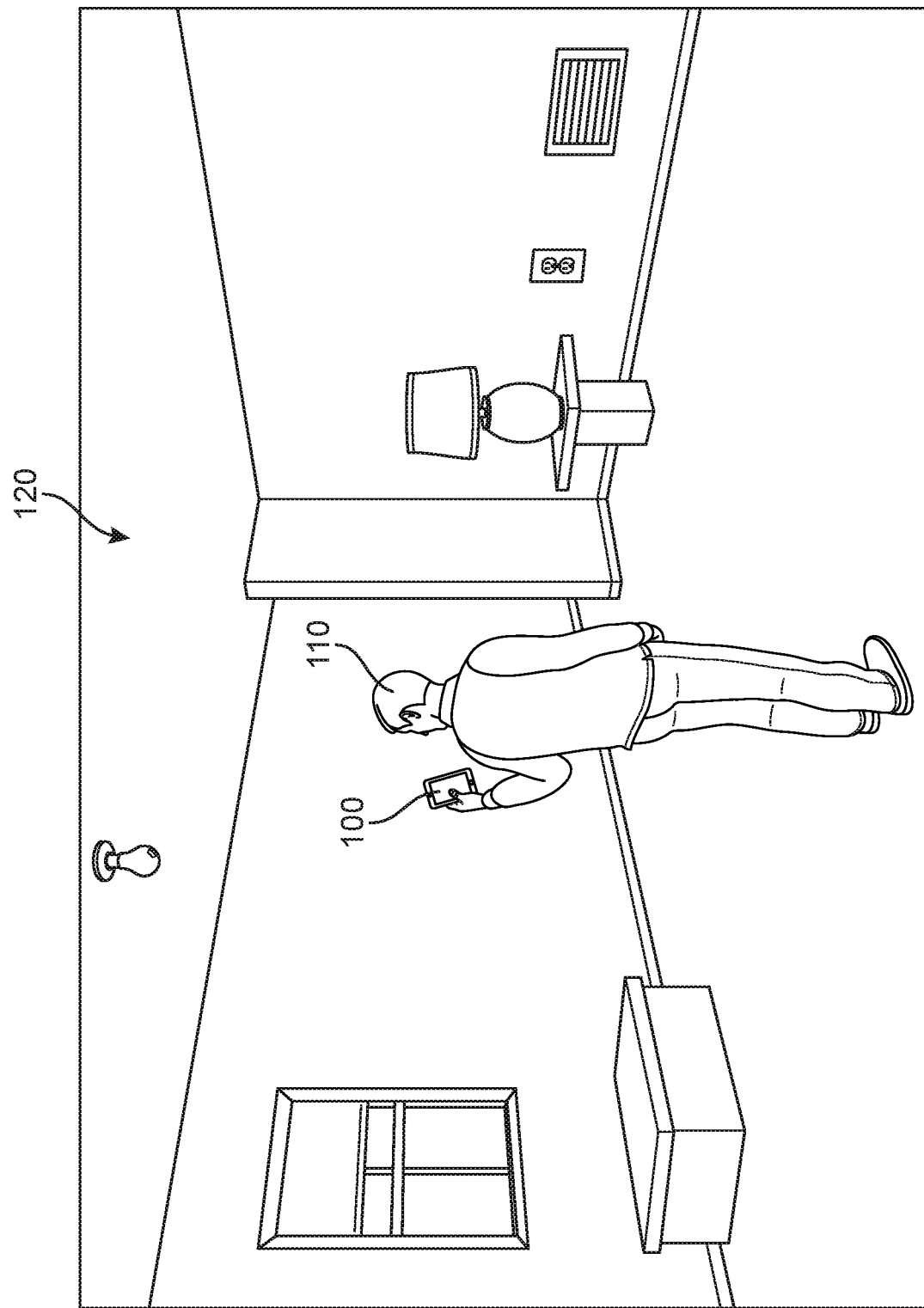
FIG. 1 is a view of a user accessing an application on a mobile device according to an embodiment.

Embodiments provide systems and methods for customizing a customized vehicle for a user from a dealer through a user interface of a mobile device. Although vehicles used in the drawings as examples include a car and a truck, other vehicles such as watercraft, aircraft, and other transportation vehicles are contemplated. Vehicles are frequently purchased by dealers from manufacturers for sale to customers (purchasers or consumers). However, purchasers seeking to purchase a used or new vehicle are frequently at a disadvantage because finding all of the information involved in purchasing a vehicle is difficult and time consuming. For example, in order to make the financial decision, purchasers may wish to compare vehicles based on price, reliability, historical repair cost, historical maintenance cost, safety, option packages, insurance costs, and lifestyle. Even though a purchaser may make an initial decision, the purchaser must endure the cumbersome and difficult finance and insurance (F&I) department of a dealership selling a vehicle to the purchaser. The finance and insurance department frequently sells additional warranties and dealer installed option packages to increase the cost on the owner even though the owner may not require these additional warranties or options based on industry data.

By providing embodiments of systems and methods for deciding on dealer installed options and/or financing at the convenience of the purchaser and without the decision making pressure at the finance and insurance office of the dealership, the purchaser can make most and/or all of the decisions regarding the purchase of a vehicle and the dealer can install all dealer installed options before the purchaser enters the dealership to receive the vehicle. The dealer may also merely present the predetermined (pre-negotiated) financial documents including any financial option packages to the purchaser when the purchaser receives the vehicle at the dealership to avoid any last-minute negotiations with the finance and insurance office. In addition, if the financial documents to make a purchase can be executed electronically, then the dealership can deliver a vehicle to the purchaser. Accordingly, Various embodiments are disclosed to empower the purchaser of a vehicle by providing pre-negotiated pricing for dealer installed option packages and financial option packages taking into account costs and the lifestyle of the purchaser, so that the purchaser obtains the beneficial dealer installed option packages and does not pay twice for financial option packages. In addition, systems and methods may also recommend alternative vehicles or alternative dealer installed option packages based on the lifestyle of the user and costs associated with the purchase of the vehicle. This greatly reduces purchaser aggravation and time during the decision making and purchasing process for purchasing a vehicle.

Figure 2:
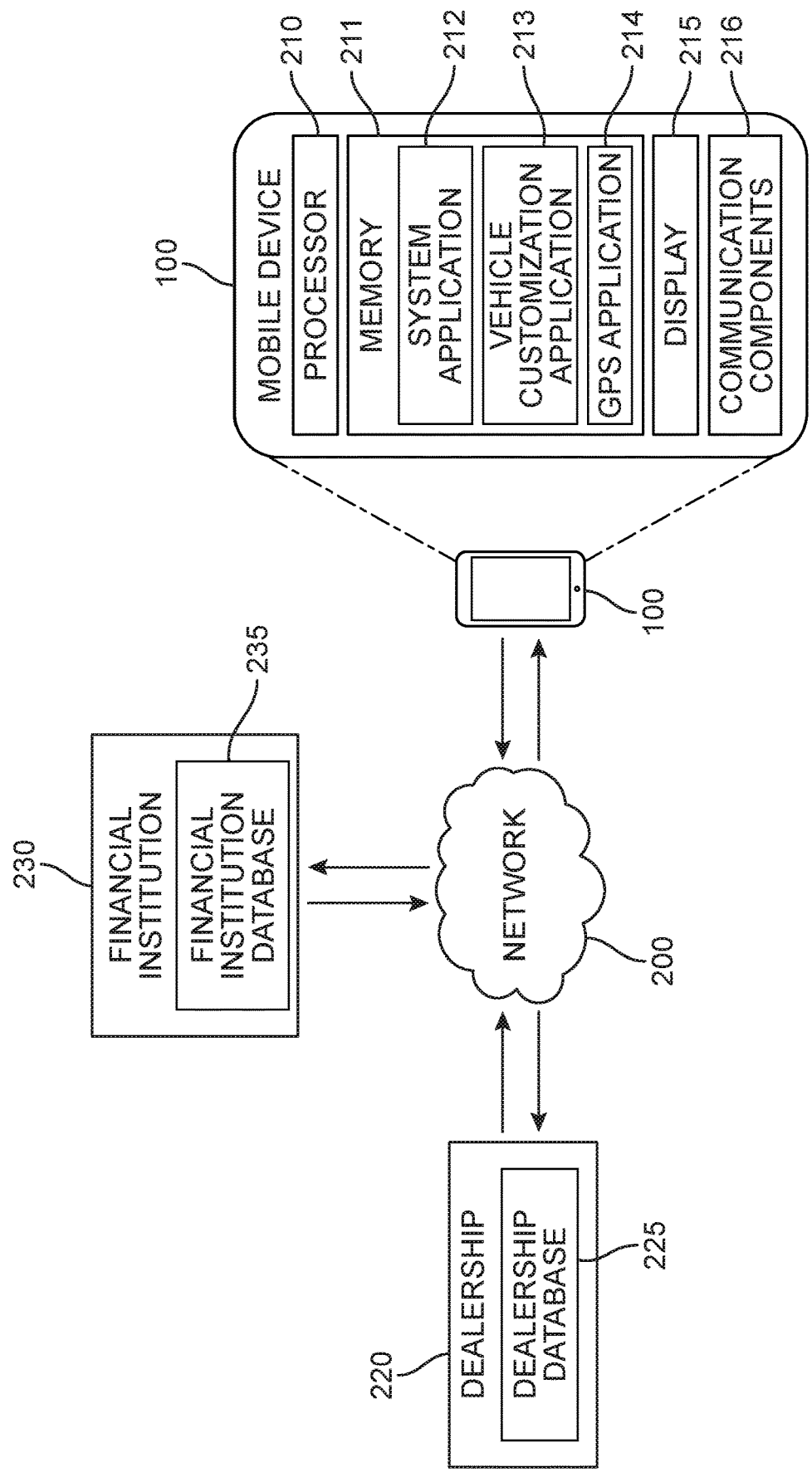
FIG. 2 is a schematic view of a network coupling to a mobile device of FIG. 1, a dealership, and a financial institution according to an embodiment.

FIG. 1 is a view of a mobile device 100 being held by a user 110 in a home 120 according to an embodiment, and FIG. 2 is a schematic view of a network 200 coupling to a mobile device 100 of FIG. 1, a dealership (dealer) 220, and a financial institution 230. In addition, mobile device 100 may be any mobile computing device such as the smartphone shown in FIG. 1 and FIG. 2. Additional examples of a mobile device 100 include a smartphone, a tablet, a smartwatch, a smart glass, a smart helmet, and a laptop. However, other mobile devices 100 are also within the scope of this patent application. In addition, the mobile device 100 has a user interface which is everything designed into a mobile device 100 with which a user 110 may interact. A display 215 shown in FIG. 2 is only one example of a component for a user interface of mobile device 100. A user interface of mobile device 100 may include a microphone, a speaker, a keypad, a screen, a touch screen, a cursor control device, a light, a voice recognition system, an optical recognition system that would authenticate a user's iris, for example, and/or any other type of interface that may be employed in the mobile device 100, which may be wireless. In some embodiments, the user interface may include therewith an ability to service a headset including a microphone and an earpiece for the user. Applications of mobile device 100 may utilize information inputted through the user interface to output information to the user 110 through the user interface of the mobile device 100.

As shown in FIG. 2, the dealership 220 includes a dealer database 225 and a financial institution 230 includes a financial institution database 235. The dealer data base 225 may be part of a computer system or connected to a computer system of dealership 220. The financial institution database 235 may be part of a computer system or connected to a computer system of the financial institution 230. In addition, a mobile device 100 may include a processor 210, a memory 211, a system application 212, a vehicle customization application 213, a global positioning system (GPS) application 214, a display 215, and communication components 216. The processor 210 may include any type of processor such as a microprocessor, a digital signal processor, an Application Specific Integrated Circuit (ASIC), or a combination of processing type devices. The processor 210 may also include specialized hardware required to implement aspects of embodiments. The memory 211 may include SRAM, DRAM, PROM, EEPROM, flash RAM, a hard disk drive, an optical media drive, or any other type of memory capable of storing data and instructions.

The processor 210 is operable to execute a plurality of software instructions that are stored in memory 211 and downloaded for execution. The plurality of software instructions may include a system application 212 such as an operating system as well as other applications such as a vehicle customization application 213 and a GPS application 214. For example, the vehicle customization application 213 may utilize artificial intelligence such as machine learning and/or rule-based learning to assist a user 110 of the mobile device 100 in selecting a vehicle with dealer installed option packages and/or financial option packages to avoid the cumbersome finance and insurance office of dealerships. In another example, the (global positioning system) GPS application 214 may be software and/or hardware designed to determine the current location of the mobile device 100 and/or location of the dealer so that the user can receive the vehicle. The GPS application 214 may be used to generate routes which may be displayed on display 215 and/or outputted as a voice through a speaker.

Figure 3:
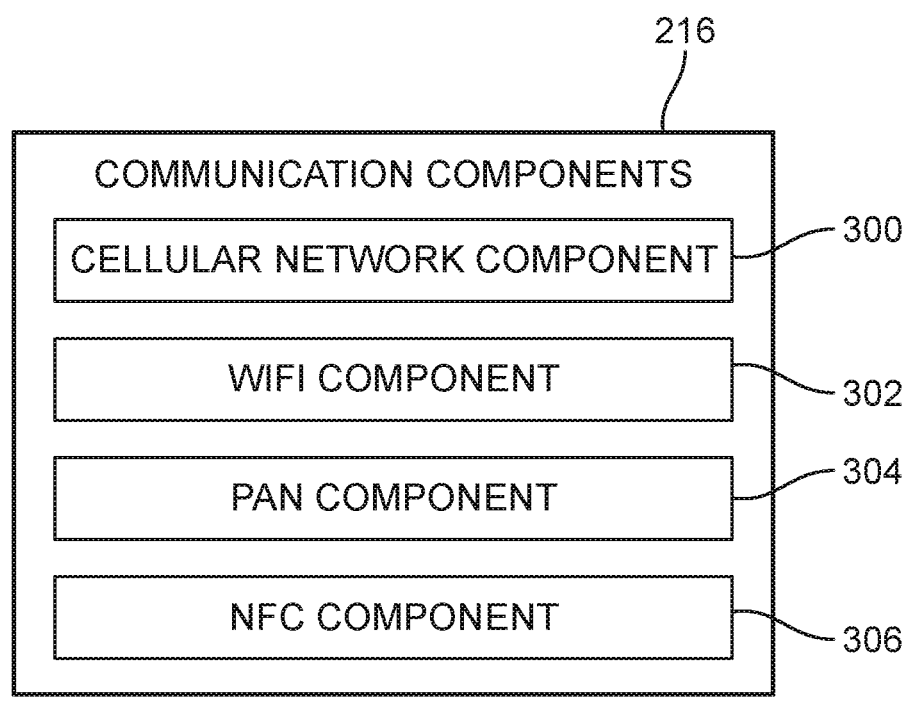
FIG. 3 is a schematic view of communications components in mobile device of FIG. 1 according to an embodiment.

FIG. 3 is a schematic view of communications components 216 in the mobile device of FIG. 1 and FIG. 2. Communication components 216 may be configured for various types of wireless communication including Bluetooth, Bluetooth Low Energy (BLE), Wi Fi, Wi Fi Direct, Long Term Evolution (LTE) Direct, Near Field Communication (NFC), or other wireless communication protocols. In order to perform wireless communication, communications components 216 may include one or more of a cellular network component 300, a WIFI component 302, a personal area network (PAN) component 304, and a near field communication (NFC) component 306. It is understood that this list of components is not exhaustive and other communication components may be added to the communication components 216 for wireless communication.

Figure 4:
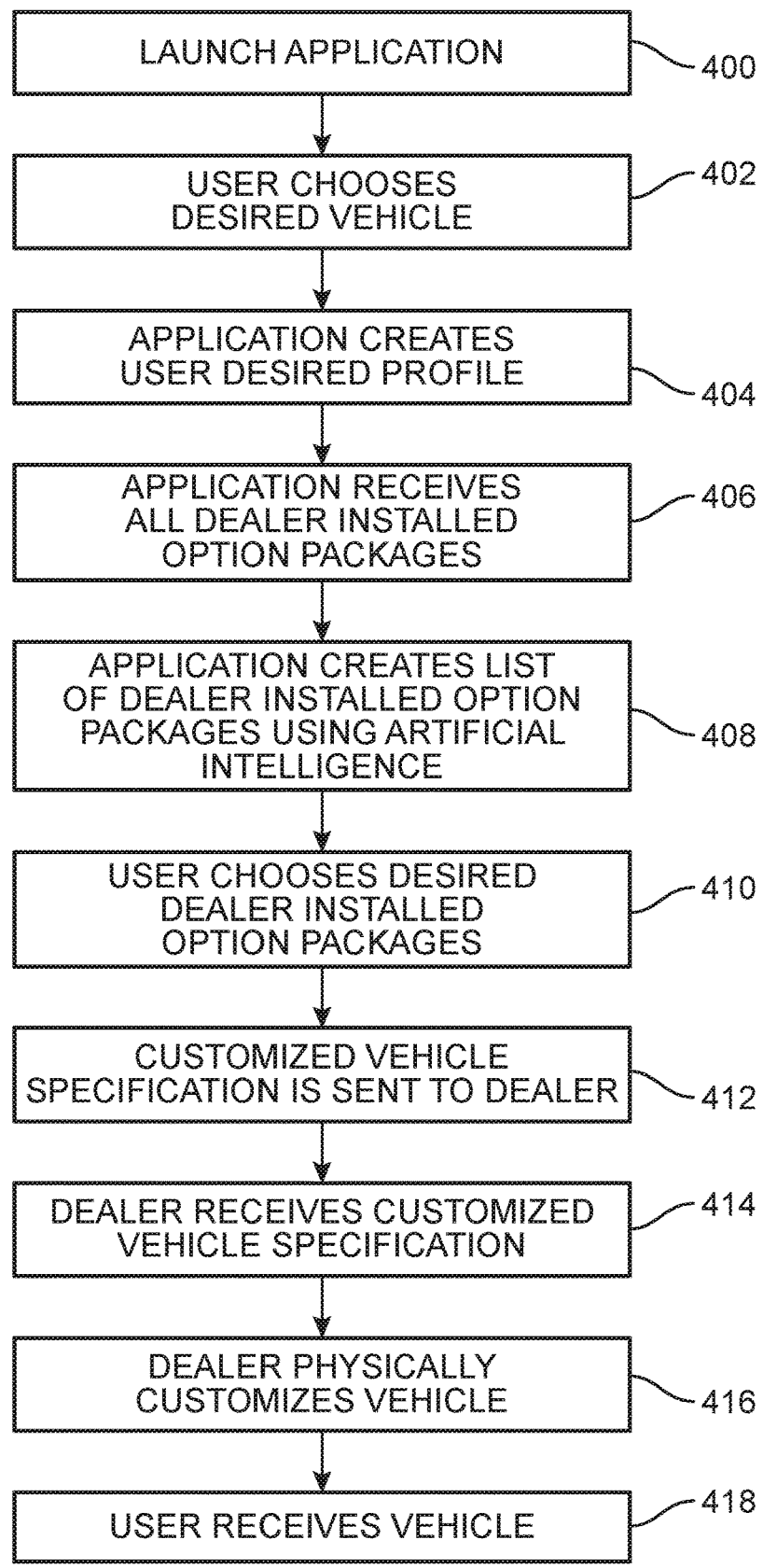
FIG. 4 is a flowchart illustrating a process for customizing a vehicle according to an embodiment.

FIG. 4 is a flowchart illustrating a process for customizing a vehicle according to an embodiment. A user 110 of mobile device 100 in FIG. 1 may launch (initiate or activate) an application such as vehicle customization application 213 in FIG. 2 through a user interface such as a display 215 or a microphone (not shown) as indicated in operation 400 of FIG. 4. Through the user interface, the user 110 of mobile device 100 may choose a desired vehicle for purchase (operation 402). The vehicle customization application 213 may create (generate) a user desires profile (operation 404), which may be stored in the memory 211 of the mobile device 100. In order to create (generate) the user desires profile, the mobile device 100 may communicate with the financial institution database 235 of financial institution 230 through a network 200 as shown in FIG. 2. For example, the financial institution database 235 may contain approved loan information as well as personal information which may include one or more of domicile information, insurance information, and lifestyle information. Domicile information includes a primary home address and may also include addresses of other residences such as a second home. Insurance information may include the insurance policies and costs of the insurance policies provided by the financial institution 230 to the user 110. For example, a user 110 may have one or more insurance policies such as a homeowner's policy, automobile insurance policy, and umbrella policy. However, the user 110 may also have insurance policies on other items such as a second home, one or more watercraft, or an airplane. Lifestyle information may include information such as marital status of user 110 and whether the user 110 has children. It is understood that these are merely examples of the types of information which a financial institution may provide to a mobile device 100 so that the vehicle customization application 213 may create a user desires profile (operation 404).

Figure 5:
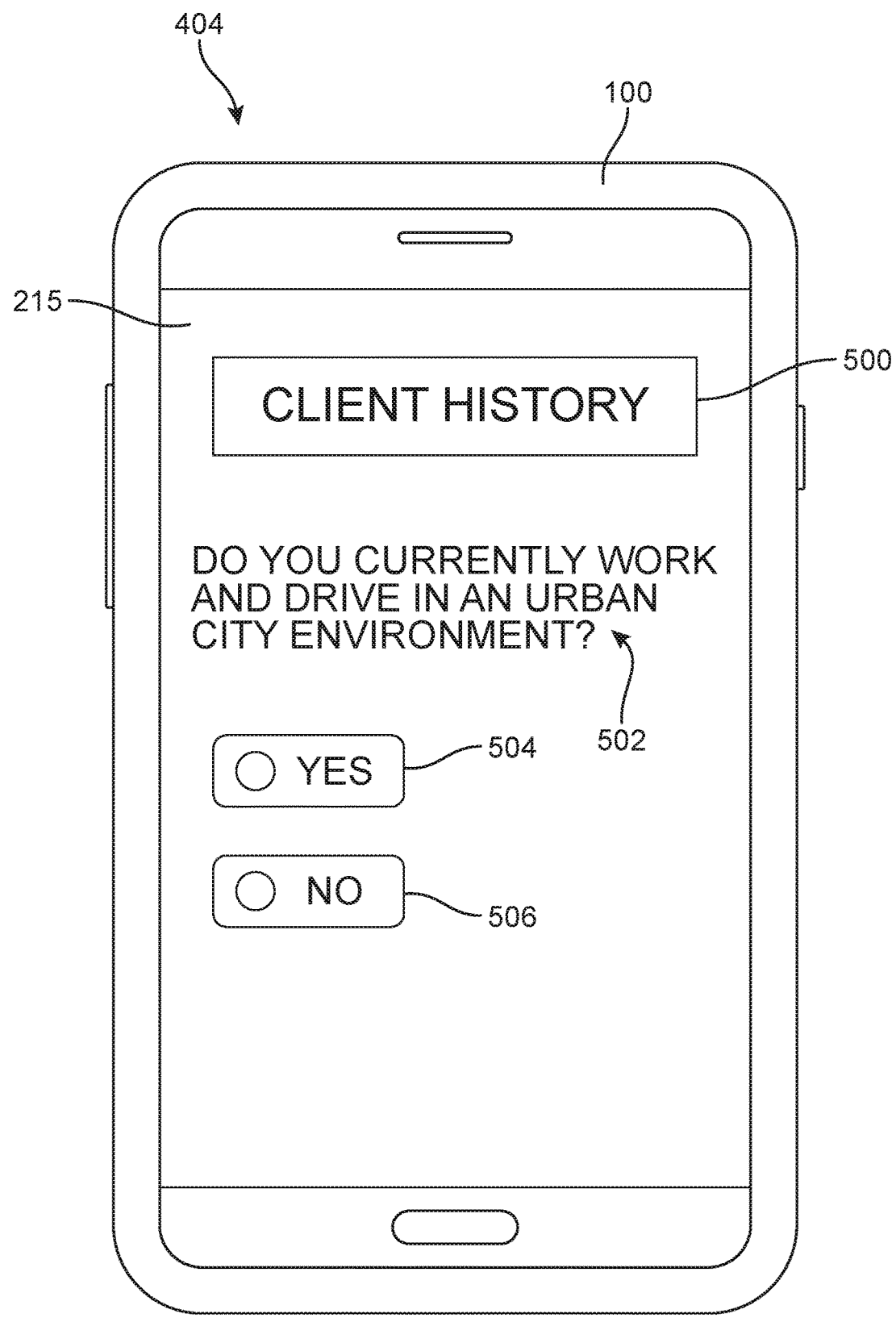
FIG. 5 is an example of an inquiry to generate recommended option packages including components for a user according to an embodiment.

In order to provide additional information to create a user desires profile, the vehicle customization application 213 may ask the user 110 additional questions (inquiries) through the user interface of the mobile device 100. These additional questions (inquires) may be generated by using artificial intelligence in order to create the user desires profile to anticipate the intended use of the vehicle by the user 110. FIG. 5 is an example of an inquiry, which will be used to create the user desires profile (operation 404) and to generate recommended option packages including components for consideration by a user 110 according to an embodiment. For example, the user interface of mobile device 100 includes a display 215 which refers to client history 500, which is also history of user 110. The vehicle customization application 213 may generate an inquiry to create (build or generate) update, enhance or improve the user desires profile, which may be used to ascertain the intended use of the vehicle and recommend dealer installed option packages. For example, an example of one inquiry may be "Do you currently work and drive in an urban city environment?" as denoted by reference numeral 502. The display 215 of the user interface of mobile device 100 may display inquiry 502 and provide an opportunity for the user 110 to respond "Yes" as denoted by reference numeral 504 or "No" as denoted by reference numeral 506 through the use of a touchscreen. By responding to this inquiry through the user interface of mobile device 100, the user 110 provides information to create (build or generate) update, enhance or improve the user desires profile, which can be used to better ascertain the intended use of the vehicle, which the user 110 is considering purchasing, and which can be used to recommend one or more dealer installed option packages for consideration by the user 110. FIG. 5 provides only one example of one inquiry 502. However, the vehicle customization application 213 may utilize the user interface of the mobile device 100 to make more than one inquiry to create the user desires profile, and the user interface of the mobile device may 100 include other technology such as a microphone, a speaker, a keypad, a cursor control device, a light, a voice recognition system, an optical recognition system that would authenticate a user's iris, for example, and/or any other type of interface that may be employed in the mobile device 100.

Figure 6:
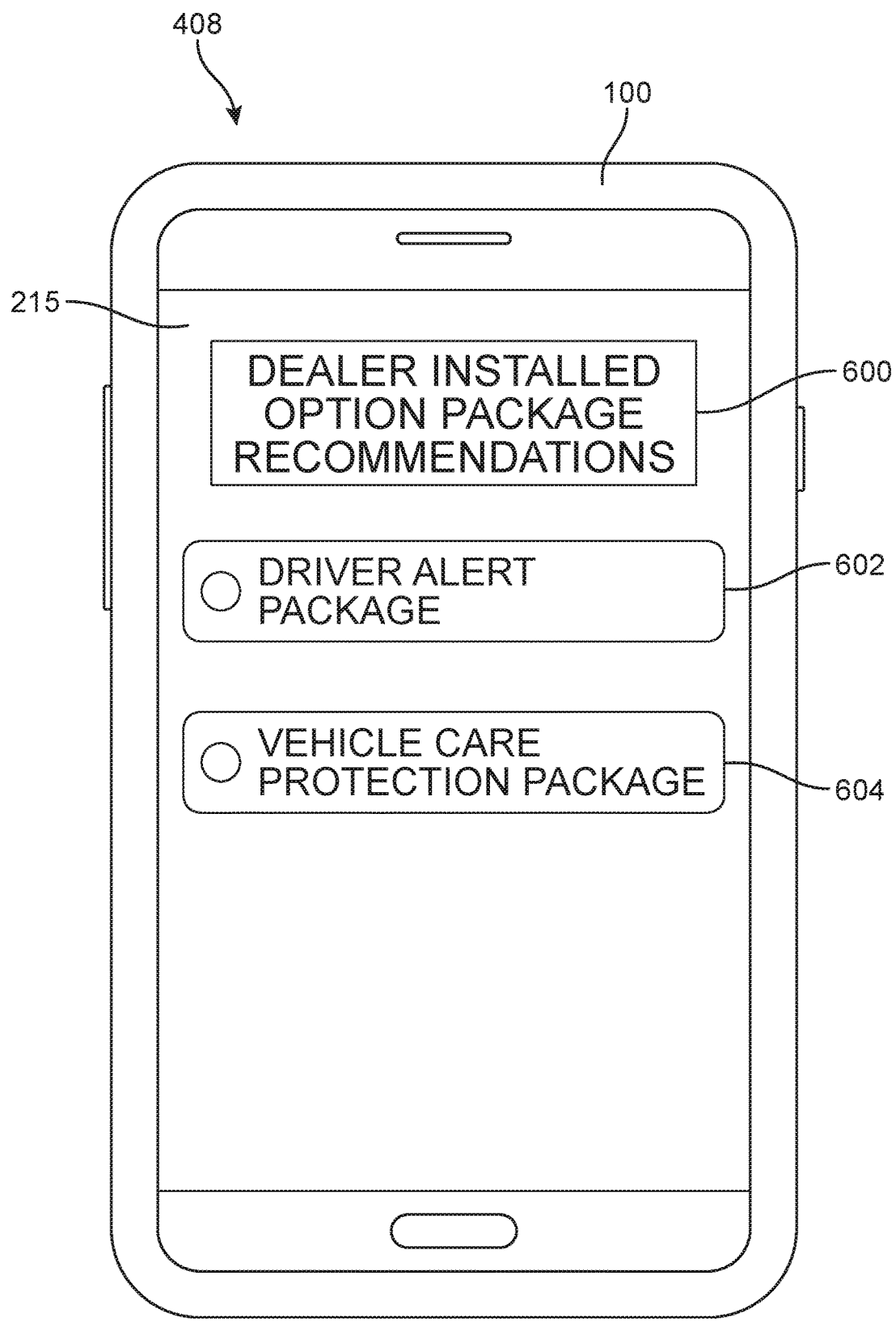
FIG. 6 is an example of a list of recommended option packages, which are based on the inquiry in FIG. 5 and which may be selected by a user, according to an embodiment.

Referring to the example in FIG. 4, after the creation of the user desires profile in operation 404, the vehicle customization application may request and receive all dealer installed option packages from a dealer database 225 of a dealer 220 through a network 200 as shown in FIG. 2 (operation 406). However, operation 406 may be performed before operation 404. Based on the created user desires file and all of the dealer installed option packages, the vehicle customization application 213 creates a list of dealer installed option packages using artificial intelligence such as machine learning (operation 408) for consideration by the user 110. For example, FIG. 6 is an example of a list of recommended dealer installed option packages (recommended dealer installed components), which are based on the inquiry in FIG. 5 and which may be selected by a user 110, according to an embodiment (operation 408). As shown in FIG. 6, a display 215 of mobile device 100 has a touch screen which displays dealer installed option package recommendations denoted by 600. In this example, the display 215 of the mobile device 100 has a touch screen which displays driver alert package 602 and vehicle care protection package 604, which are the dealer installed option package recommendations 600 provided by the vehicle customization application 213 by artificial intelligence.

Figure 7:
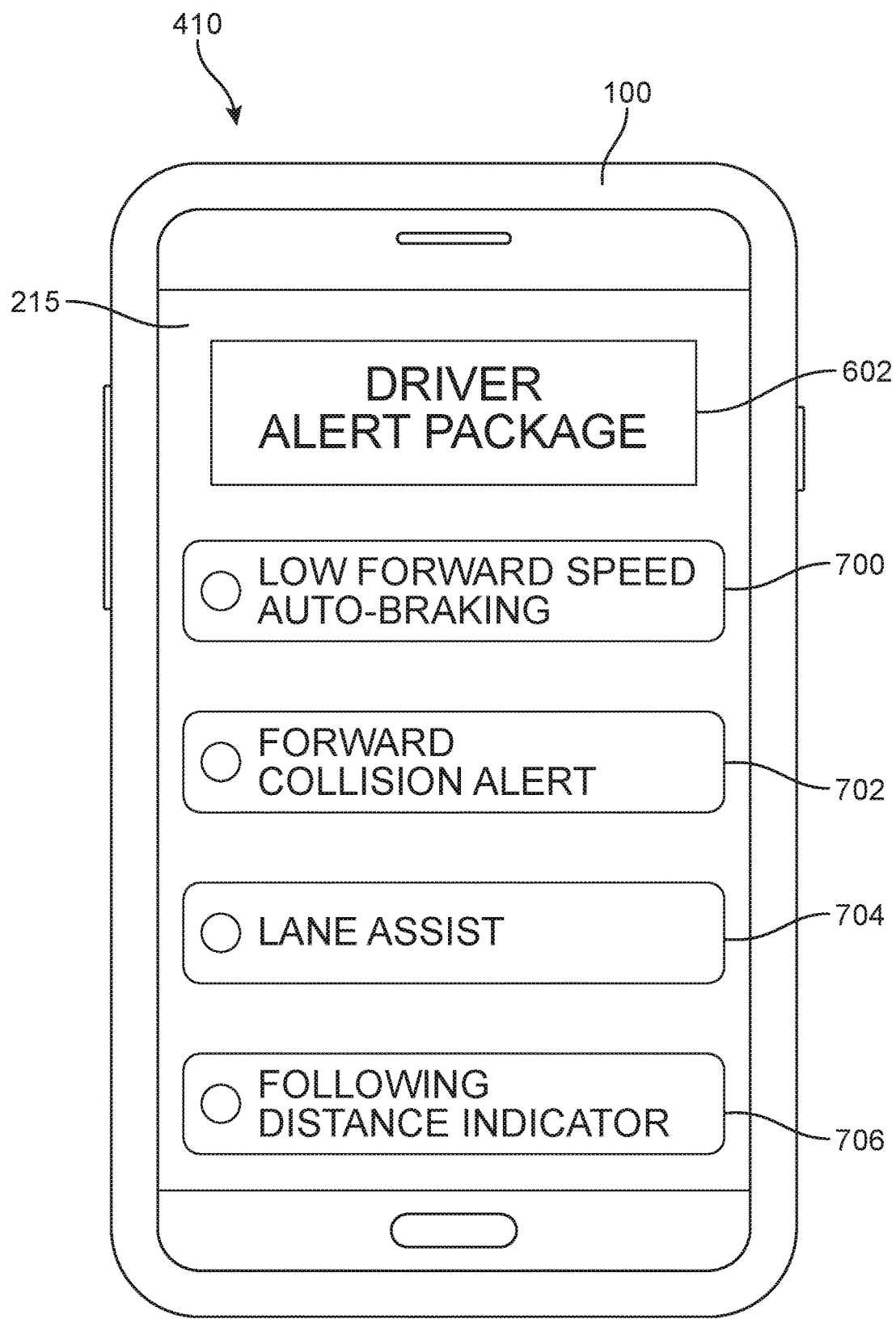
FIG. 7 is an example of recommended components, which are based on a selection of one of the recommended components of FIG. 6 and which may be selected by a user, according to an embodiment.
Figure 8:
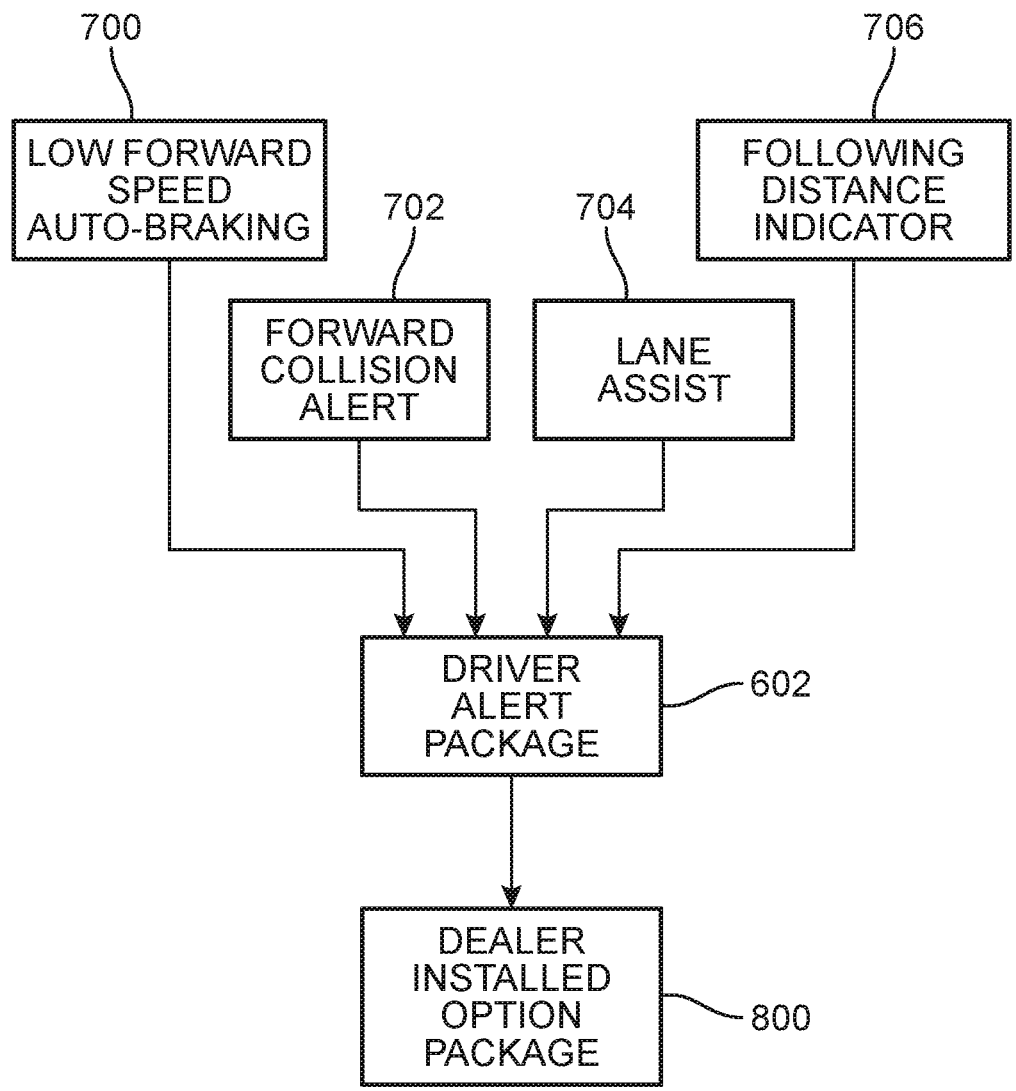
FIG. 8 is a schematic diagram of all of the recommended components of FIG. 7 of the selected option package for installation by a dealer according to an embodiment.

If the user 110 selects driver alert package 602 through the touch screen of display 215 of the mobile device 100, FIG. 7 shows an example of recommended components (700-706), which are based on a selection of one of the recommended components 700-706 of driver alert package 602 of FIG. 6 and which may be selected by a user 110, according to an embodiment. As shown in FIG. 7, the touchscreen of display 215 provides user 110 with an opportunity to select one or more components of the driver alert package 602, which include a low forward speed auto-breaking 700, a forward collision alert 702, a lane assist 704, and a following distance indicator 706 in order to customize the driver alert package 602 (operation 410). If user 110 follows the recommendation of the vehicle customization application 213, the user 110 will select a low forward speed auto-breaking 700, a forward collision alert 702, a lane assist 704, and a following distance indicator 706 to provide the driver alert package 602, which becomes the dealer installed option package 800 as shown in FIG. 8. It should be noted that if the user 110 had also selected the recommended vehicle care protection package 604 in FIG. 6, the vehicle customization application 213 would have provided recommended options to customize a vehicle care protection package as another dealer installed option package. Accordingly, the driver alert package 602 is only one example of the possible dealer installed option packages and additional dealer installed option packages are contemplated.

Referring to FIG. 4, after the user 110 utilizes the user interface of mobile device 100 to select desired dealer installed option packages (operation 410), a customized vehicle specification is generated and sent to the dealer 220 (operation 412). After the dealer 220 receives the customized vehicle specification (414), the dealer physically installs the selected dealer installed option packages to customize the vehicle (operation 416) and the user receives the vehicle (operation 418). A (global positioning system) GPS application 214 may be software and/or hardware designed to determine the current location of the mobile device 100 and/or location of the dealer so that the user 110 can receive the vehicle. The GPS application 214 may be used to generate routes which may be displayed on display 215 and/or outputted as a voice through a speaker, so that the user 110 can locate the dealership 220 to receive the vehicle.

Figure 9:
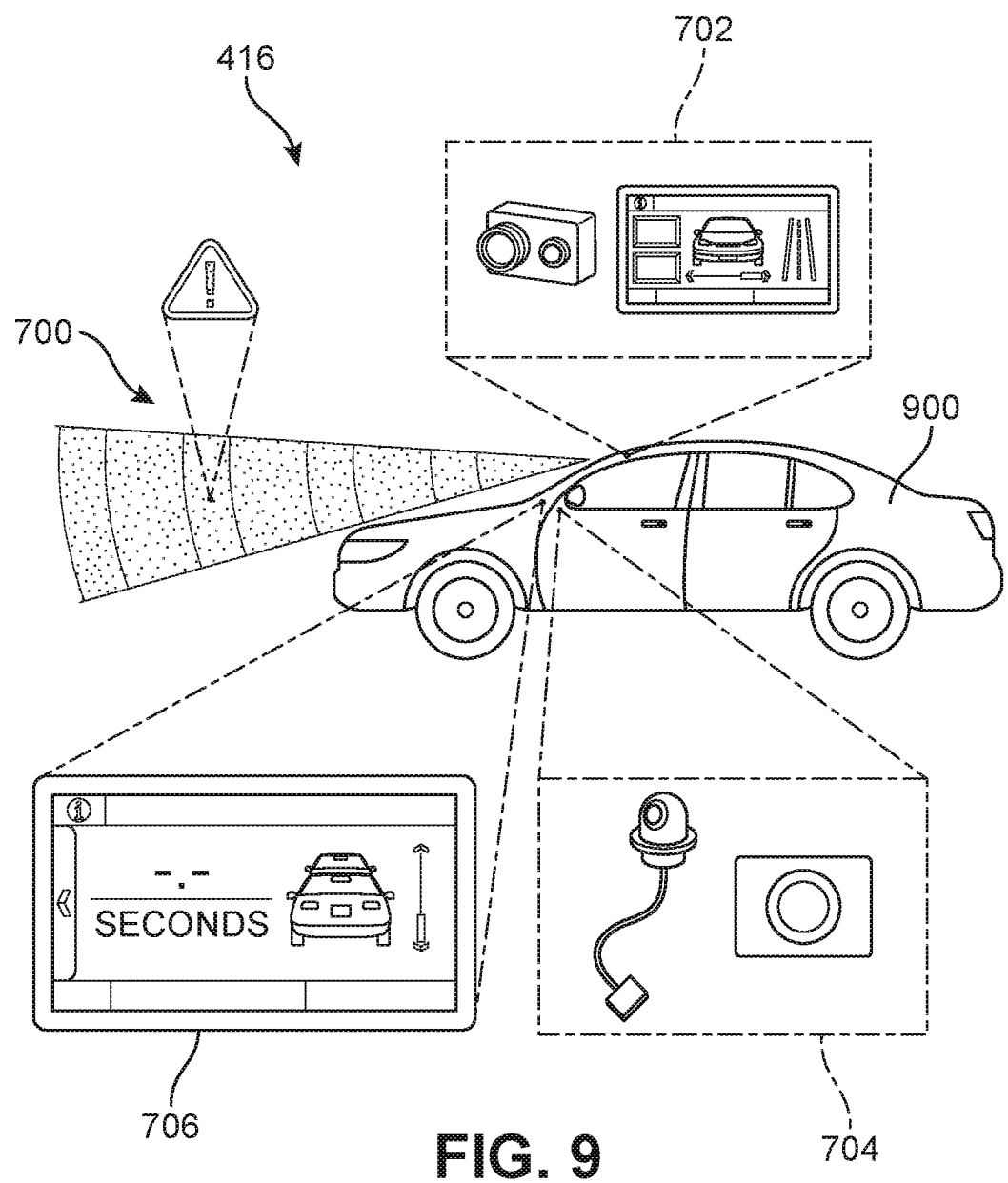
FIG. 9 is a schematic view of installation of the recommended components of the selected option package of FIGS. 7-8 on a vehicle by a dealer according to an embodiment.

FIG. 9 is a schematic view of installation of the recommended components of the selected option package of FIGS. 7-8 on a vehicle 900 by a dealer 220 according to an embodiment (operation 416). The vehicle 900 is not limited to a car. The vehicle 900 may be a truck, a sports utility vehicle, or any other type of vehicle. The low forward speed auto-breaking 700, a forward collision alert 702, a lane assist 704, and a following distance indicator 706 are all dealer installed components, which includes sensors, output devices, software, or other components to provide the dealer installed option package. As discussed above, components for one or more dealer installed option packages may be selected by user 110 and installed by the dealership 220 to customize a vehicle 900 for the user 110, so that the user 110 receives the vehicle without making selections and negotiating with the dealership 220 at the finance and insurance office at the dealership. This provides the user 110 with more time to reflect and consider the option packages at the convenience of the user 110.

Figure 10:
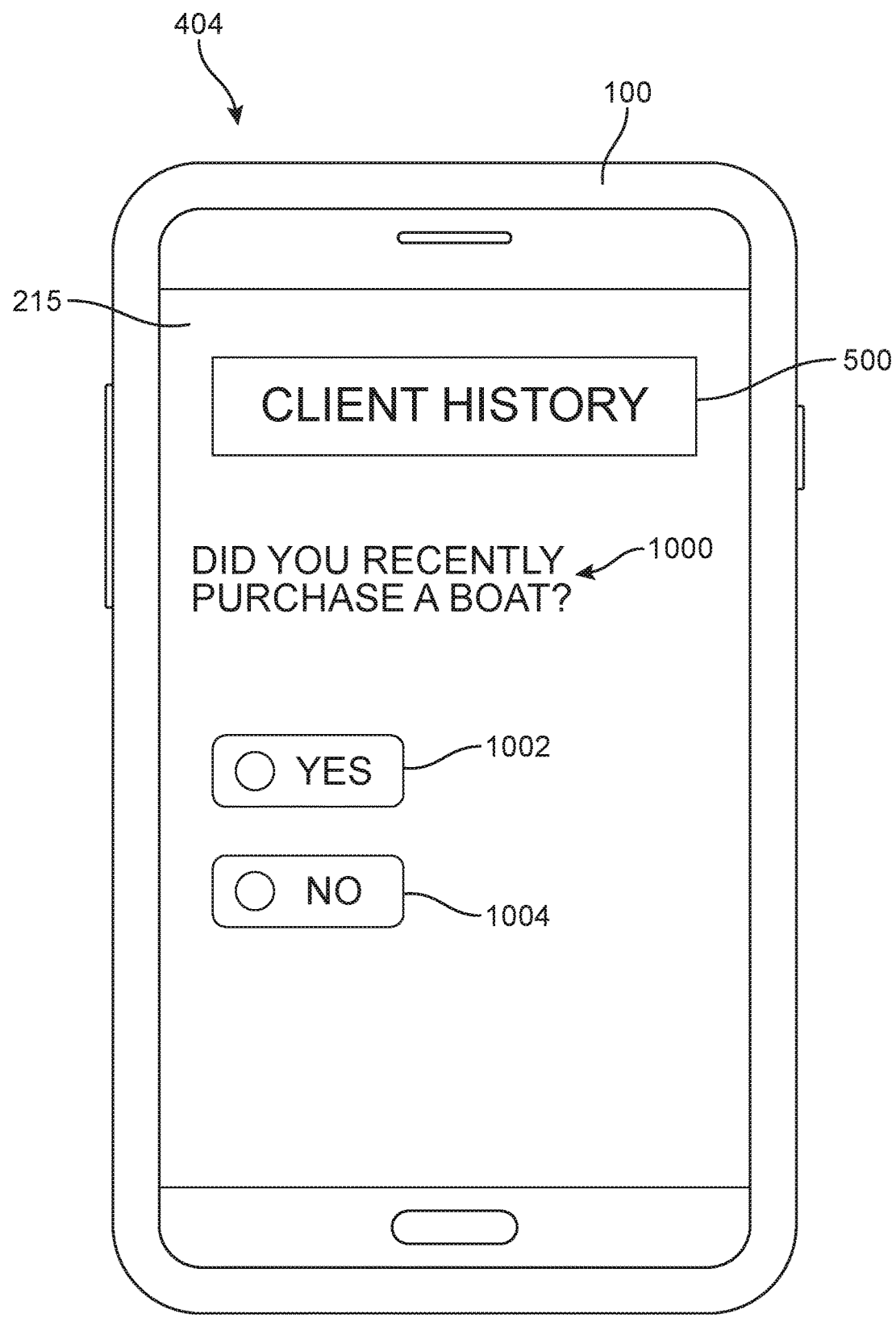
FIG. 10 is an example of an inquiry to generate recommended option packages including components for a user according to an embodiment.

Referring to FIG. 4 and FIGS. 10-14, additional dealer installed option packages may be provided to the user 110 through the mobile device 100 by using the vehicle customization application 213 as discussed above. Referring to FIG. 4, the vehicle customization application 213 may request additional information regarding the user 110 (denoted by client history 500 in FIGS. 5 and 10) in order to create the user desire profile in operation 404. For example, as shown in FIG. 10, an additional inquiry, which may be generated by artificial intelligence or a predetermined list of inquiries, may be "Did you recently purchase a boat?" as denoted by reference numeral 1000. Alternative or additional inquiries could simply be "Do you own a boat?" or "Do you intend to purchase a boat soon?" In response to the question "Did you recently purchase a boat?" denoted by reference numeral 1000 and displayed on touch screen display 215 of mobile device 100, a user 110 can respond by answering Yes denoted by reference numeral 1002 or No denoted by reference numeral 1004 by using the display 215, which has a touchscreen. By responding to this inquiry through the user interface of mobile device 100, the user 110 provides information to create (build or generate) update, enhance or improve the user desires profile, which can be used to better ascertain the intended use of the vehicle, which the user 110 is considering purchasing, and which can be used to recommend one or more dealer installed option packages for consideration by the user 110. FIG. 10 provides only one additional example of an inquiry 1000. However, as discussed above, the vehicle customization application 213 may utilize the user interface of the mobile device 100 to make more than one inquiry to create the user desires profile, and the user interface of the mobile device 100 may include other technology such as a microphone, a speaker, a keypad, a cursor control device, a light, a voice recognition system, an optical recognition system that would authenticate a user's iris, for example, and/or any other type of interface that may be employed in the mobile device 100

Figure 11:
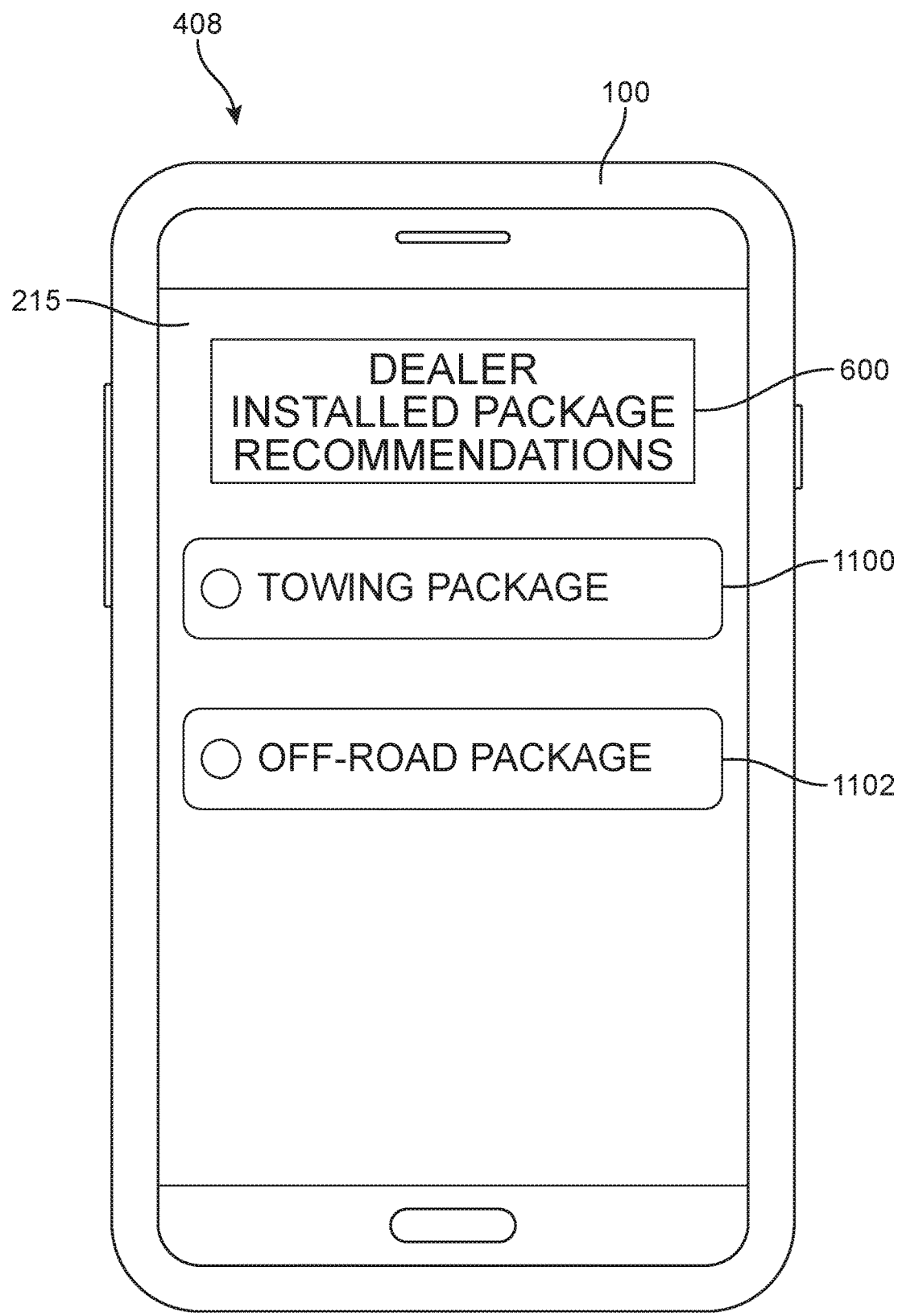
FIG. 11 is an example of a list of recommended option packages, which are based on the inquiry in FIG. 10 and which may be selected by a user, according to an embodiment.

Referring to the example in FIG. 4, after the creation of the user desires profile in operation 404, the vehicle customization application may request and receive all dealer installed option packages from a dealer database 225 of a dealer 220 through a network 200 as shown in FIG. 2 (operation 406). However, operation 406 may be performed before operation 404. Based on the created user desires file and all of the dearer installed option packages, the vehicle customization application 213 creates a list of dealer installed option packages using artificial intelligence such as machine learning (operation 408) for consideration by the user 110. For example, FIG. 11 is another example of a list of recommended dealer installed option packages (recommended dealer installed components), which are based on the inquiry in FIG. 10 and which may be selected by a user 110, according to an embodiment (operation 408). As shown in FIG. 11, a display 215 of mobile device 100 has a touch screen which displays dealer installed option package recommendations denoted by 600 in FIG. 11. In this example, the display 215 of the mobile device 100 has a touch screen which displays towing package 1100 and off-road package 1102, which are the dealer installed option package recommendations 600 provided by the vehicle customization application 213 by artificial intelligence.

Alternatively, if the financial institution database 235 indicated that the user 110 had an insurance policy on a boat, operation 404 may have skipped the inquiry "Did you recently purchase a boat?" denoted by reference numeral 1000 in FIG. 10, and automatically moved to the screen in FIG. 11 displaying the recommended dealer installed option packages (dealer installed package recommendations 600), so that the user could select a towing package 1100 and/or an off-road package 1102.

Figure 12:
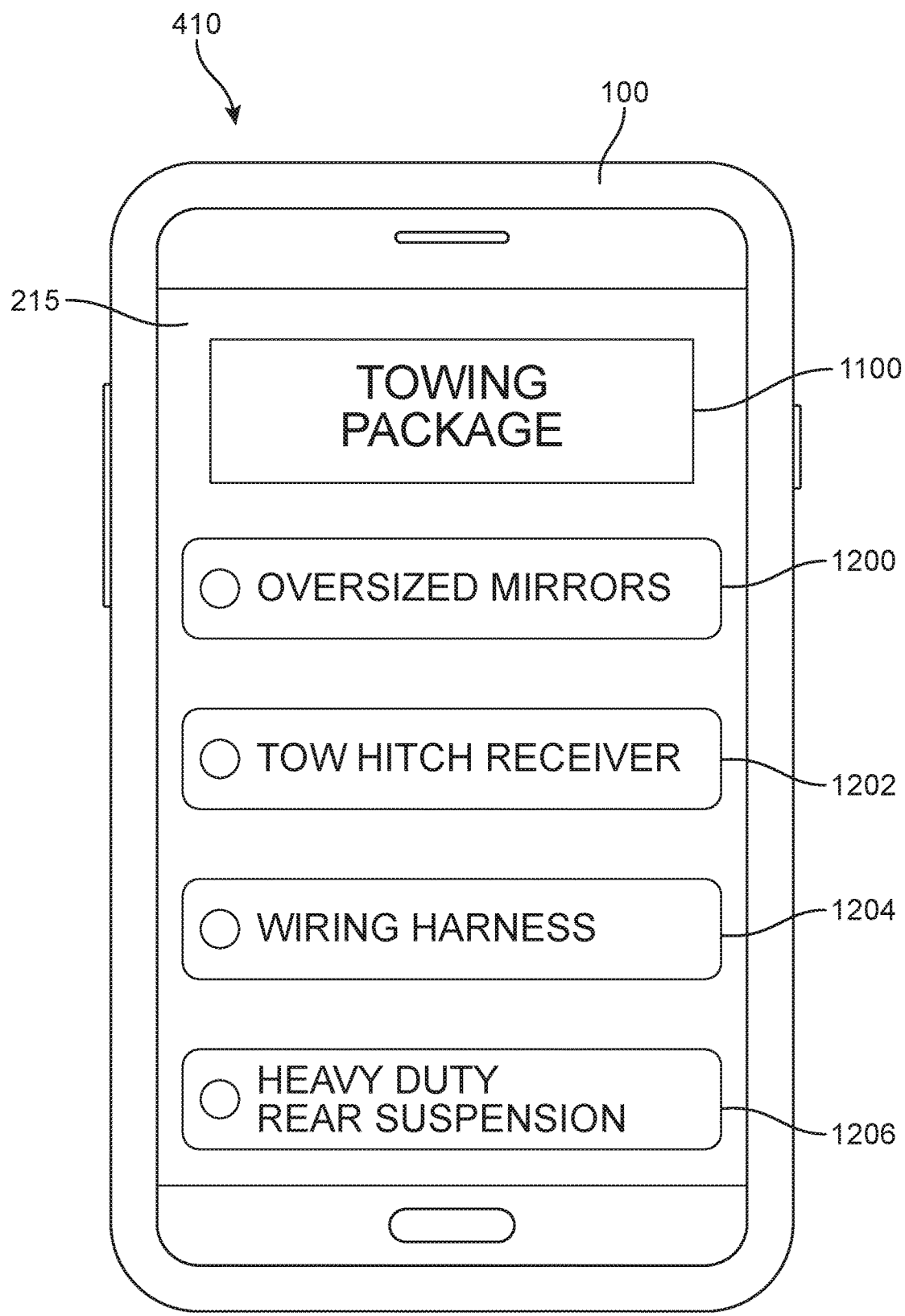
FIG. 12 is an example of recommended components, which are based on a selection of one of the recommended components of FIG. 11 and which may be selected by a user.
Figure 13:
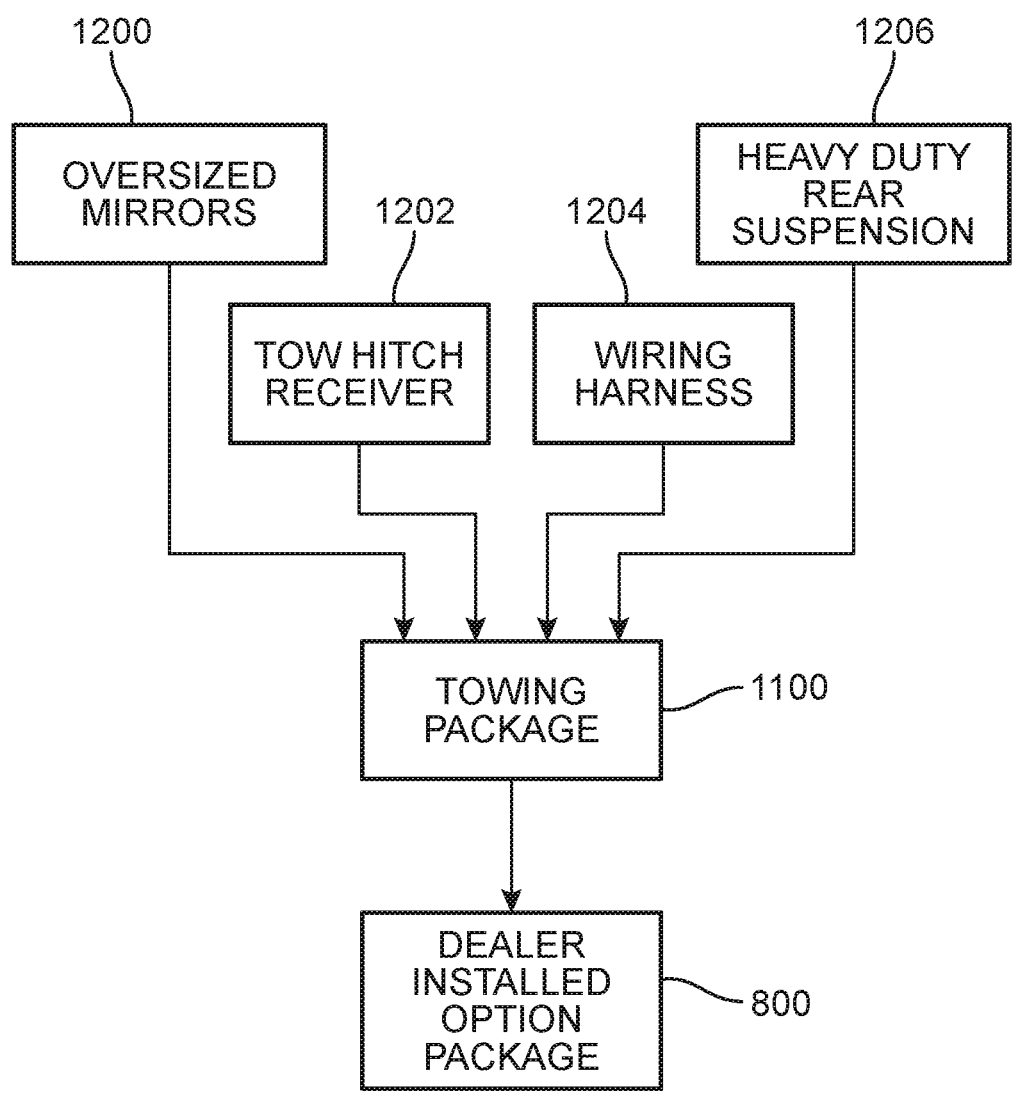
FIG. 13 a schematic diagram of all of the recommended components of FIG. 12 of the selected option package for installation by a dealer according to an embodiment.

If the user 110 selects towing package 1100 through the touch screen of display 215 of the mobile device 100, FIG. 12 shows an example of recommended components (1200-1206), which are based on a selection of one of the recommended components 1100 of FIG. 11 and which may be selected by a user 110, according to an embodiment. As shown in FIG. 12, the touchscreen of display 215 provides user 110 with an opportunity to select one or more components of the tow package 1100, which include an oversized mirrors component 1200, a tow hitch receiver 1202, a wiring harness 1204, and a heavy-duty rear suspension 1206 (operation 410). If user 110 follows the recommendation of the vehicle customization application 213, the user 110 will select an oversized mirrors component 1200, a tow hitch receiver 1202, a wiring harness 1204, and a heavy-duty rear suspension 1206, which becomes the dealer installed option package 1100 as shown in FIG. 13. It should be noted that if the user 110 had also selected the off-road dealer installed package 1102 in FIG. 11, the vehicle customization application 213 would have provided recommended options to customize the off-road dealer installed package 1102 as another dealer installed option package. Accordingly, the towing package 1100 is only one example of the possible dealer installed option packages and additional dealer installed option packages are contemplated.

Referring to FIG. 4, once the user 110 utilizes the user interface of mobile device 100 to select desired dealer installed option packages (operation 410), a customized vehicle specification is generated and sent to the dealer 220 (operation 412). After the dealership 220 receives the customized vehicle specification (414), the dealership physically installs the selected dealer installed option packages to customize the vehicle (operation 416) and the user receives the vehicle (operation 418). A (global positioning system) GPS application 214 may be software and/or hardware designed to determine the current location of the mobile device 100 and/or location of the dealer so that the user 110 can receive the vehicle. The GPS application 214 may be used to generate routes which may be displayed on display 215 and/or outputted as a voice through a speaker, so that the user 110 can locate the dealership 220 to receive the vehicle.

Figure 14:
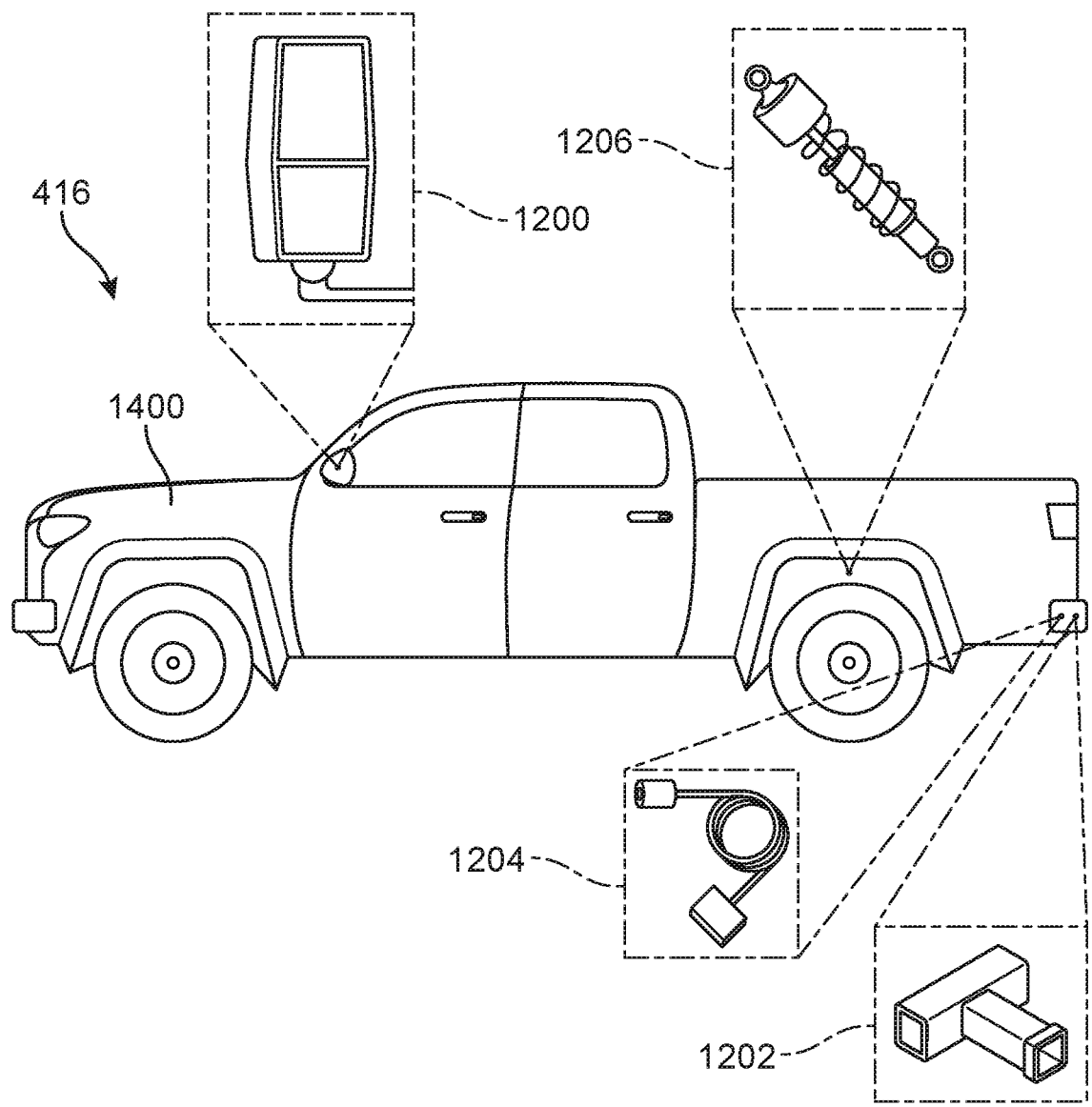
FIG. 14 is a schematic view of installation of the recommended components of the selected option package of FIGS. 11-13 on a vehicle by a dealer according to an embodiment.

FIG. 14 is a schematic view of installation of the recommended components of the selected option package of FIGS. 11-12 on a vehicle 1400 by a dealer 220 according to an embodiment (operation 416). The vehicle 1400 is not limited to a truck. The vehicle 900 may be a car, a sports utility vehicle, or any other type of vehicle. The oversized mirrors component 1200, a tow hitch receiver 1202, a wiring harness 1204, and a heavy-duty rear suspension 1206 are all dealer installed components. As discussed above, components for one or more dealer installed option packages may be selected by user 110 and installed by the dealership 220 to customize a vehicle 1400 for the user 110, so that the user 110 receives the vehicle without making selections and negotiating with the dealership 220 at the finance and insurance office at the dealership. This provides the user 110 with more time to reflect and consider the option packages at the convenience of the user 110.

As discussed above, additional inquiries can be generated by the vehicle customization application 213 and responses to these inquiries can be made by the user 110 through the user interface of the mobile device 100. In addition, vehicle customization application 213 can use information retrieved from other databases such as the financial institution database 235 to generate recommendations for dealer installed option packages. For example, based on the intended geographic location for use of the selected vehicle, the vehicle customization application 213 can recommend whether to request dealer installed option packages for paint protection, underbody protection, glass, or tire/wheel protection. If the user 110 has children or has an application on the mobile device indicating the user 110 drives for a driving service, the customization application 213 may recommend a dealer installed option package for fabrics to keep the vehicle clean. As discussed above, these are only examples and many other examples are contemplated.

Figure 15:
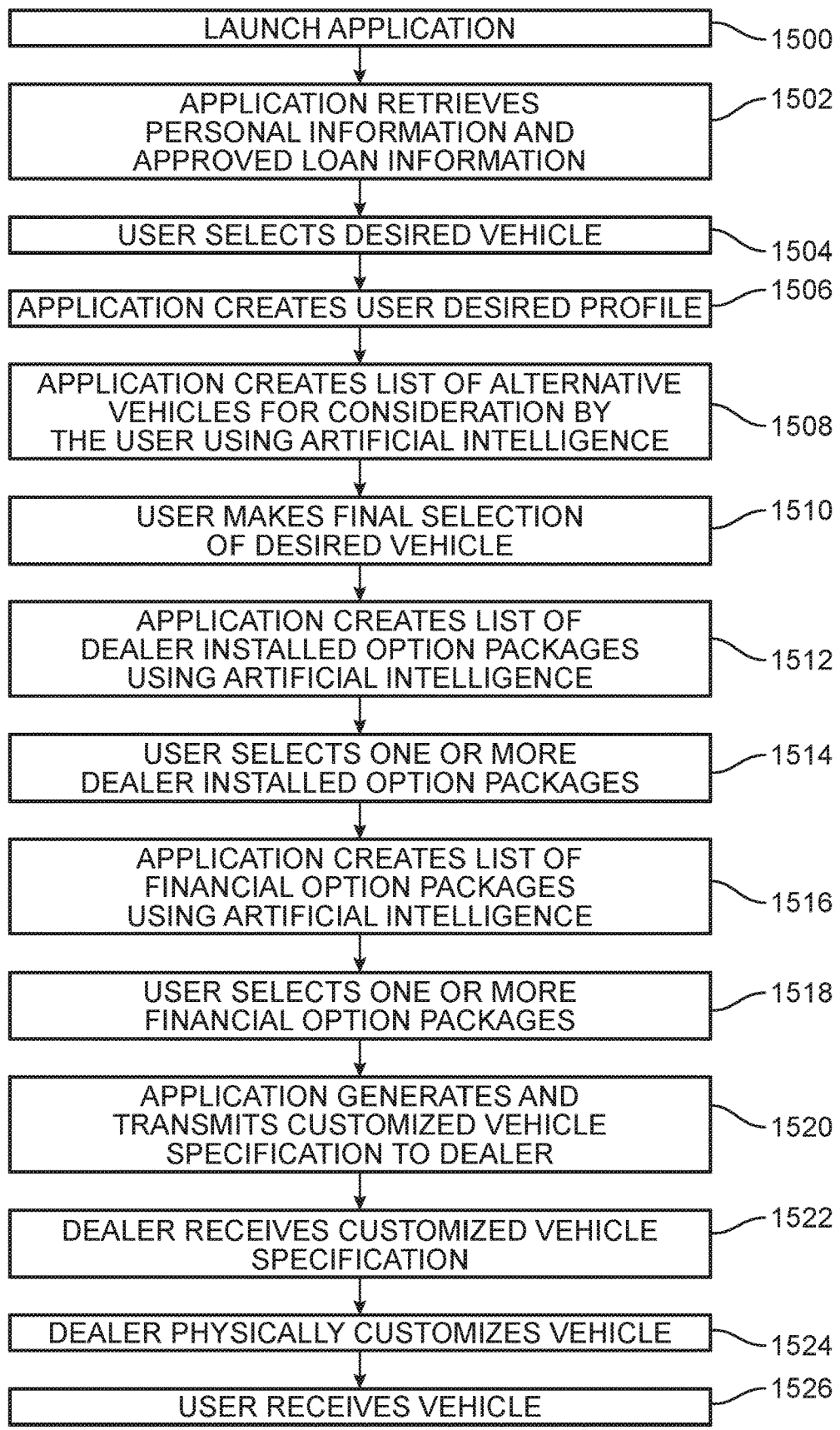
FIG. 15 is a flowchart illustrating a process for customizing a vehicle according to an embodiment.

FIG. 15 is a flowchart illustrating a process for customizing a vehicle according to an embodiment. A user 110 of mobile device 100 in FIG. 1 may launch (initiate or activate) an application such as vehicle customization application 213 in FIG. 2 through a user interface such as a display 215 or a microphone (not shown) as indicated in operation 1500 of FIG. 15. The mobile device 100 executing the vehicle customization application 213 in FIG. 2 may access personal information and approved loan information from the financial institution database 235 of financial institution 230 through network 200 in FIG. 2 (operation 1502). As discussed above, personal information may include one or more of domicile information, insurance information, and lifestyle information. Domicile information includes a primary home address and may also include addresses of other residences such as a second home. Insurance information may include the insurance policies and costs of the insurance policies provided by the financial institution 230 to the user 110. For example, a user 110 may have one or more insurance policies such as a homeowner's policy, automobile insurance policy, and umbrella policy. However, the user 110 may also have insurance policies on other items such as a second home, one or more watercraft, or an airplane. Lifestyle information may include information such as marital status of user 110 and whether the user 110 has children. It is understood that these are merely examples of the types of information which a financial institution may provide to a mobile device 100 so that the vehicle customization application 213 may create a user desires profile.

Through the user interface, the user 110 of mobile device 100 may choose a desired vehicle for purchase (operation 1504). The vehicle customization application 213 may create (generate) a user desires profile (operation 1506), which may be stored in the memory 211 of the mobile device 100 based upon approved loan information and personal information retrieved from the financial institution database 235. In addition, the financial institution database 235 may also contain additional information such as credit card information of user 110, which stored in the financial institution database. This credit card information may indicate that the user parks in a parking garage frequently. In addition, the financial institution database 235 may contain statistics on historic maintenance costs and repair costs for the selected vehicle and other vehicles sold at the dealership 220. The financial institution database 235 may also have information regarding the insurance cost savings of adding dealer installed option packages pertaining to safety to the selected vehicle. In addition to this information, the financial institution database 235 may include information related to other vehicles sold at the dealership 220.

The vehicle customization application 213 may use all of this data and artificial intelligence to generate a list of alternative vehicles for consideration by user 110 (operation 1508). After the user 110 has an opportunity to compare the initial selected vehicle with alternative vehicles, the user 110 can make a final selection of the desired vehicle (operation 1510), which will hereinafter be referred to as the selected vehicle. After the vehicle is selected in operation 1510, the vehicle customization application 213 creates a list of dealer installed option packages using artificial intelligence for the user 110, which can be displayed on a display 215 having a touchscreen (operation 1512). The dealer installed option packages may be retrieved from the dealer database 225 of dealership 200 through a network 220 of FIG. 2. The user 110 may select one or more dealer installed option packages (operation 1514).

The vehicle customization application 213 may also use artificial intelligence to create a list of financial option packages (operation 1516). For example, the credit card information of user 110 discussed above may indicate that the user parks in a parking garage frequently. Therefore, the vehicle customization application 213 may recommend that the user 110 obtain dent or ding protection. If the user 110 already has glass or roadside insurance protection from the financial institution 230, then the vehicle customization application 213 may recommend that the user 110 decline any offer made by the dealership for additional glass or roadside protection to save the user 110 from paying too much for insurance. The vehicle customization application 213 may also use artificial intelligence and the financial institution database to recommend purchasing or leasing the desired vehicle including consideration of the approved loan information (operation 1516).

After the user 110 is presented with one or more financial option packages through the user interface such as display 215 in FIG. 2, the user 110 may select one or more financial option packages (operation 1518). The vehicle customization application 213 generates and transmits the customized vehicle specification to the dealership 220 (operation 1520) and the dealership 220 receives the customized vehicle specification (operation 1520). After the dealership 220 receives the customized vehicle specification (operation 1522), the dealership physically installs the selected dealer installed option packages to customize the vehicle (operation 1524) and the user receives the vehicle (operation 1526). The dealership 220 and/or the financial institution 230 can finalize the agreement based on the one or more selected financial option packages.

Figure 16:
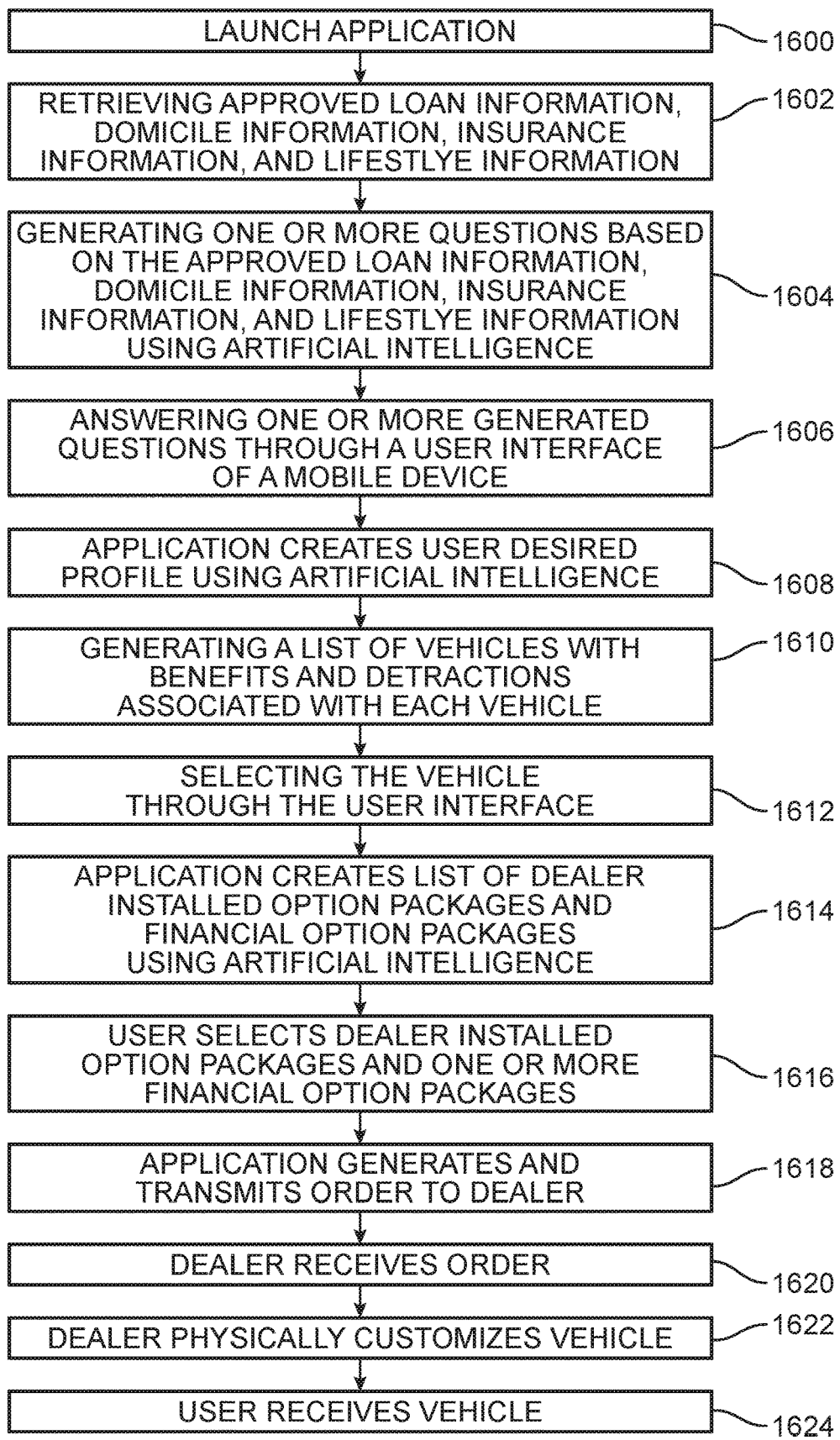
FIG. 16 is a flowchart illustrating a process for customizing a vehicle according to an embodiment.

FIG. 16 is a flowchart illustrating a process for customizing a vehicle according to an embodiment. A user 110 of mobile device 100 in FIG. 1 may launch (initiate or activate) an application such as vehicle customization application 213 in FIG. 2 through a user interface such as a display 215 or a microphone (not shown) as indicated in operation 1600 of FIG. 16. The mobile device 100 executing the vehicle customization application 213 in FIG. 2 may access approved loan information, domicile information, insurance information, and lifestyle information from the financial institution database 235 of financial institution 230 through network 200 in FIG. 2 (operation 1602). Domicile information includes a primary home address and may also include addresses of other residences such as a second home. Insurance information may include the insurance policies and costs of the insurance policies provided by the financial institution 230 to the user 110. For example, a user 110 may have one or more insurance policies such as a homeowner's policy, automobile insurance policy, and umbrella policy. However, the user 110 may also have insurance policies on other items such as a second home, one or more watercraft, or an airplane. Lifestyle information may include information such as marital status of user 110 and whether the user 110 has children. It is understood that these are merely examples of the types of information which a financial institution may provide to a mobile device 100 so that the vehicle customization application 213 may create a user desires profile.

After retrieving information in operation 1602, the vehicle customization application 213 generates one or more questions based on the approved loan information, domicile information, insurance information, and lifestyle information using artificial intelligence such as machine learning and/or rule-based learning (operation 1604). The user 110 may respond to each question through a user interface of the mobile device 100 which may include a display 215 with a touchscreen or another user interface device (operation 1606). Examples of the question and answer may be found in FIGS. 5 and 10. Based on the retrieved approved loan information, domicile information, insurance information, and lifestyle information as well as the responses to the questions in operation 1606, the vehicle customization application creates a user desire profile using artificial intelligence (operation 1608). The vehicle customization application 213 can generate a list of vehicles with benefits and detractions associated with each vehicle (operation 1610) from which the user 110 can select through the user interface of the mobile device 100 in operation 1612.

Once the user 110 has selected the vehicle (operation 1612), the vehicle customization application 213 creates dealer installed option packages and financial packages using artificial intelligence for the user 213 to choose from (operation 1614). The user 110 selects one or more dealer installed option packages, such as the dealer installed packages shown in FIGS. 6-8 and 11-13, and selects one or more financial option packages (operation 1616). After the user 110 makes the selections (operation 1616), the application generates and transmits an order to the dealership 220 based on the selections made by user 110 (operation 1618). The dealership 220 receives the order (operation 1620). After the dealership 220 receives the order (operation 1620), the dealership physically installs the selected dealer installed option packages to customize the vehicle (operation 1622) and the user receives the vehicle (operation 1624). The order may include one or more of the customized vehicle specification and one or more financial option packages. The dealership 220 and/or the financial institution 230 can finalize the agreement based on the one or more selected financial option packages. As discussed above, FIG. 16 is only one example of an embodiment and other embodiments are also contemplated.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, smart watches, glass helmets, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of embodiments may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

A non-transitory computer readable medium may store software comprising instructions executable by one or more computing devices (computers).

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

One or more embodiments may utilize any kind of network (wired or wireless) for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for improving the efficiency of customizing a vehicle with dealer installed option packages, the method being implemented by an application running on a mobile device and the application being in communication with a dealer database of a dealer, the dealer having a dealer location, the method comprising:
   initiating a vehicle customization application stored on the mobile device;
   receiving, via the vehicle customization application, a user selected vehicle;
   automatically generating, using machine learning, one or more questions for the user;
   creating a user desires profile for the user of the vehicle customization application based on responses to the one or more questions, the user desires profile indicating at least an intended use of the vehicle;
   retrieving all dealer installed option packages for the selected vehicle from the dealer database of the dealer;
   generating, based on the intended use of the vehicle, a list of dealer installed option packages for the user from the retrieved dealer installed option packages and displaying, via the application, the list for the user;
   receiving, via the vehicle customization application, a user selected dealer installed option package from the list;

transmitting a customized vehicle specification of the vehicle including the user selected dealer installed option package to the dealer from the mobile device;

retrieving, via a GPS application, a current location of the mobile device;

generating a route from the current location to the dealer location; and displaying, via the vehicle customization application, the route for the user.

2. The method according to claim 1, wherein the mobile device comprises one of a smartphone, a tablet, a smartwatch, a smart glass, a smart helmet, and a laptop.

3. The method according to claim 1, wherein the mobile device is coupled to the dealer database and a financial institution database through a network.

4. The method according to claim 3, wherein creating the user desires profile includes retrieving approved loan information from the financial institution database of the financial institution.

5. The method according to claim 1, wherein the method further includes receiving responses to the one or more questions.

6. The method according to claim 4, wherein the method further includes using machine learning to generate the user desires profile based on the responses to the one or more questions.

7. The method according to claim 4, wherein generating the list of dealer installed option packages includes using the approved loan information.

8. The method according to claim 1, wherein receiving the customized vehicle specification includes receiving approved loan information and approved pricing information from the mobile device.

9. The method according to claim 1, wherein the method further comprises:

receiving, via the vehicle customization application, a user selected dealer installed option package from the list;

displaying, for the user, individually selectable components of the user selected dealer installed option package;

receiving, via the vehicle customization application, user selected components of the user selected dealer installed option package.

10. The method according to claim 9, wherein the customized vehicle specification of the vehicle includes the user selected components of the user selected dealer installed option package.

11. A method for improving the efficiency of customizing a vehicle with dealer installed option packages, the method being implemented by an application running on a mobile device and the application being in communication with a dealer database of a dealer, the method comprising:

initiating a vehicle customization application stored on the mobile device;

retrieving personal information and approved loan information from a financial institution database of a financial institution through a network;

receiving, via the vehicle customization application, a user selected vehicle;

creating, using machine learning, a user desires profile for the user of the vehicle customization application including the personal information, the approved loan information, and the user selected vehicle;

generating a list of dealer installed option packages for the user selected vehicle for the user using machine learning based upon available dealer installed option packages retrieved from the dealer database of the dealer through the network, the personal information, and the approved loan information;

receiving, via the vehicle customization application, a user selected dealer installed option package from the list;

displaying, for the user, individually selectable components of the user selected dealer installed option package;

receiving, via the vehicle customization application, user selected components of the user selected dealer installed option package;

generating a customized vehicle specification of the vehicle including the user selected components of the user selected dealer installed option package; and transmitting the customized vehicle specification of the vehicle to the dealer from the mobile device.

12. The method according to claim 11, wherein the customized vehicle specification includes loan information and approved pricing information.

13. The method according to claim 11, wherein the personal information includes one or more of domicile information, insurance information, and lifestyle information.

14. The method according to claim 13, wherein the lifestyle information includes intended use of the vehicle.

15. The method according to claim 11, wherein the method further comprises:

retrieving, via a GPS application, a current location of the mobile device;

generating, via the vehicle customization application, a route from the current location to a dealer location associated with the dealer; and displaying, via the vehicle customization application, the route for the user.

16. The method according to claim 11, further comprising:

generating a list of financial option packages for the user using machine learning based upon available financial packages retrieved from the dealer database of the dealer and available financial packages retrieved from the financial institution database of the financial institution through the network before generating the customized vehicle specification.

17. The method according to claim 11, further comprising:

generating a list of alternative vehicles with benefits associated with each alternative vehicle for consideration by the user using artificial intelligence based upon the user desires profile; and receiving a user selection corresponding to one of the alternative vehicles and substituting the one alternative vehicle for the selected vehicle so that the one alternative vehicle becomes the selected vehicle before generating the list of dealer installed option packages.

18. The method according to claim 11, wherein the mobile device comprises one of a smartphone, a tablet, a smartwatch, a smart glass, a smart helmet, and a laptop.

19. A method for improving the efficiency of customizing a vehicle with dealer installed option packages by automatically anticipating an intended use of the vehicle, the method being implemented by an application running on a mobile device, the method comprising:

communicating, via the application, with a financial institution database;

retrieving from the financial institution database, via the application, approved loan information, domicile information, insurance information, and lifestyle information of the user from the financial institution database of the financial institution;

automatically generating, using machine learning, one or more questions for the user to answer through the user interface based on the approved loan information, the domicile information, the insurance information, and the lifestyle information;

displaying, via the application, the one or more questions for the user;

receiving, at the application, answers to the one or more questions;

automatically creating, using machine learning, a user desires profile for the user of the vehicle application to anticipate an intended use of the vehicle, wherein the machine learning generates the user desires profile based upon the answers to the one or more questions, the approved loan information, the domicile information, the insurance information, and the lifestyle information;

generating, using machine learning, a list of vehicles with benefits and detractions associated with each vehicle for consideration by the user based upon the intended use of the vehicle;

receiving, at the application, a user selected vehicle from among the list of vehicles;

generating, using machine learning, a list of dealer installed option packages based on the intended use of the vehicle;

receiving, at the application, one or more user selected dealer installed option packages from the generated list of dealer installed option packages;

transmitting, via the application, an order of the vehicle including the one or more user selected dealer installed option packages to a dealer having a dealer location;

retrieving, via a GPS application, a current location of the mobile device;

generating, via the application, a route from the current location to the dealer location; and displaying, via the application, the route for the user.

20. The method according to claim 19, wherein the mobile device comprises one of a smartphone, a tablet, a smartwatch, a smart glass, a smart helmet, and a laptop.

\* \* \* \* \*